United States Patent
Park et al.

(10) Patent No.: US 10,841,277 B2
(45) Date of Patent: Nov. 17, 2020

(54) ONE STEP REMOVED SHADOW NETWORK

(71) Applicant: UT Battelle, LLC, Oak Ridge, TN (US)

(72) Inventors: Brent K. Park, Oak Ridge, TN (US); Stacy J. Prowell, Oak Ridge, TN (US); Richard A. Raines, Oak Ridge, TN (US); Joseph P. Trien, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 222 days.

(21) Appl. No.: 16/102,377

(22) Filed: Aug. 13, 2018

(65) Prior Publication Data
US 2019/0052600 A1 Feb. 14, 2019

Related U.S. Application Data

(60) Provisional application No. 62/545,097, filed on Aug. 14, 2017.

(51) Int. Cl.
*H04L 29/06* (2006.01)
*H04L 12/939* (2013.01)
(Continued)

(52) U.S. Cl.
CPC .............. *H04L 63/02* (2013.01); *H04L 12/66* (2013.01); *H04L 49/552* (2013.01);
(Continued)

(58) Field of Classification Search
CPC ..... H04L 63/1433; H04L 63/02; H04L 12/66; H04L 41/145; H04L 47/34; H04L 69/18; H04L 69/16
(Continued)

(56) References Cited

U.S. PATENT DOCUMENTS

| | | | | |
|---|---|---|---|---|
| 5,805,588 A | * | 9/1998 | Petersen | H04L 49/254 370/356 |
| 5,944,798 A | * | 8/1999 | McCarty | H04L 12/433 370/216 |

(Continued)

OTHER PUBLICATIONS

Lai, Haiguang, et al. "A parallel intrusion detection system for high-speed networks." International Conference on Applied Cryptography and Network Security. Springer, Berlin, Heidelberg, 2004. (Year: 2004).*

(Continued)

*Primary Examiner* — Syed A Zaidi
(74) *Attorney, Agent, or Firm* — Lempia Summerfield Katz LLC

(57) ABSTRACT

A system and method includes an operational network that communicates with an external network by opening a first transmission protocol socket. A data diode coupled to the operational network and a gateway enables the one-way transfer of all information received from the external network and transmitted by the operational network to the gateway such that no information travels from the gateway to the operational network or the external network. The gateway opens a second transmission protocol socket by mapping a sequence number to an acknowledgement number and increasing that mapped acknowledgement number by a value of one. A transmitter then transmits the acknowledgment to a remote network or a gateway.

23 Claims, 11 Drawing Sheets

(51) Int. Cl.
*H04L 12/66* (2006.01)
*H04L 12/801* (2013.01)
*H04L 12/24* (2006.01)

(52) U.S. Cl.
CPC .......... *H04L 63/1433* (2013.01); *H04L 69/16* (2013.01); *H04L 69/18* (2013.01); *H04L 41/145* (2013.01); *H04L 47/34* (2013.01)

(58) Field of Classification Search
USPC .......................................................... 726/12
See application file for complete search history.

(56) References Cited

U.S. PATENT DOCUMENTS

| | | | | |
|---|---|---|---|---|
| 7,095,747 | B2* | 8/2006 | Sarmiento | H04L 29/12009 370/352 |
| 8,276,202 | B1* | 9/2012 | Dubrovsky | H04L 63/0245 726/22 |
| 2003/0177253 | A1* | 9/2003 | Schuehler | H04L 43/18 709/230 |
| 2004/0008713 | A1* | 1/2004 | Knight | G06F 13/28 370/428 |
| 2006/0059163 | A1* | 3/2006 | Frattura | H04L 63/30 |
| 2006/0104288 | A1* | 5/2006 | Yim | H04L 69/16 370/395.52 |
| 2014/0059216 | A1* | 2/2014 | Jerrim | H04L 67/104 709/224 |
| 2014/0164670 | A1* | 6/2014 | Voorhees | G06F 13/4022 710/316 |
| 2014/0229519 | A1* | 8/2014 | Dietrich | H04L 67/10 709/201 |
| 2014/0359018 | A1* | 12/2014 | Sun | H04L 65/403 709/204 |
| 2015/0264091 | A1* | 9/2015 | Lin | H04L 67/12 709/228 |
| 2015/0264731 | A1* | 9/2015 | Lin | H04M 1/72522 455/41.2 |
| 2017/0286614 | A1* | 10/2017 | Morris | G06F 9/546 |

OTHER PUBLICATIONS

Kulesza, Kamil, and Zbigniew Kotulski. "Countermeasures against traffic analysis for open networks." Enigma conference on cryptography. 2005. (Year: 2005).*

Hsu FH, Hwang YL, Tsai CY, Cai WT, Lee CH, Chang K. TRAP: A three-way handshake server for TCP connection establishment. Applied Sciences. Nov. 2016;6(11):358. (Year: 2016).*

NPL Search Results (Year: 2020).*

NPL Search Terms (Year: 2020).*

* cited by examiner

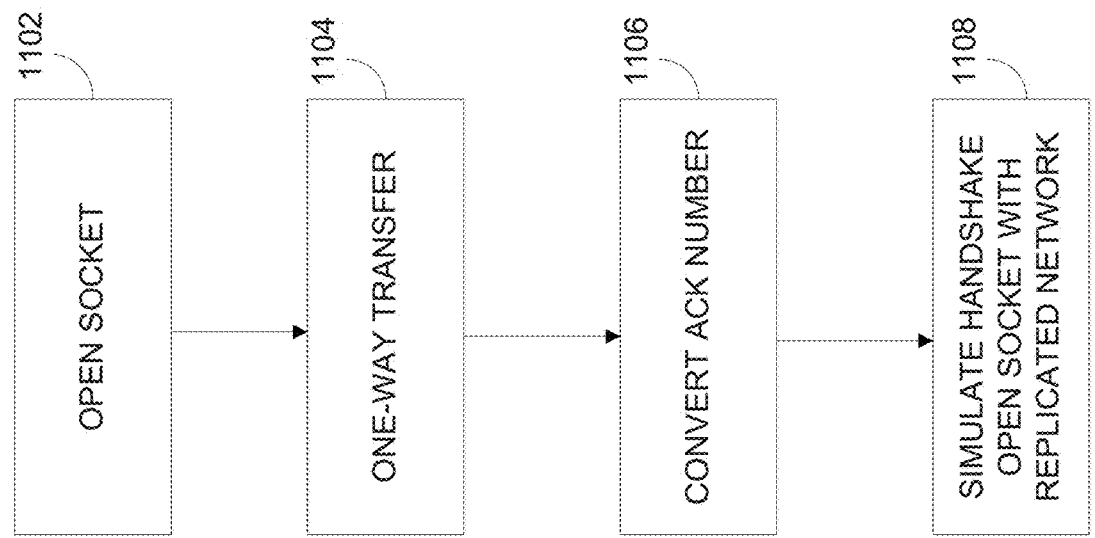

ONE STEP REMOVED SHADOW NETWORK

PRIORITY CLAIM

This application claims priority to U.S. Provisional Patent Application No. 62/545,097, titled "One Step Removed Shadow Network" which was filed on Aug. 14, 2017, which is herein incorporated by reference.

STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

BACKGROUND

Technical Field

This disclosure relates to replicating networks and more specifically to replicating portions of operational networks that process real traffic without passing data outside of the replicated portions of the operational network.

Related Art

Integrating new technologies to existing operational networks presents many challenges. These challenges include understanding how the technology operates within a network, understanding how the technology interacts with other systems, evaluating the technology's utility, configuring its use, and training staff.

These challenges increase with newer technologies, especially with technologies developed for high technology organizations. Yet, the nature of the cyber threats means that robust systems must continuously implement new technology to counter emerging threats.

DESCRIPTION OF THE DRAWINGS

FIG. 11 is a process interfacing the operational network and the external network to the shadow network.

DETAILED DESCRIPTION

Figure 1:
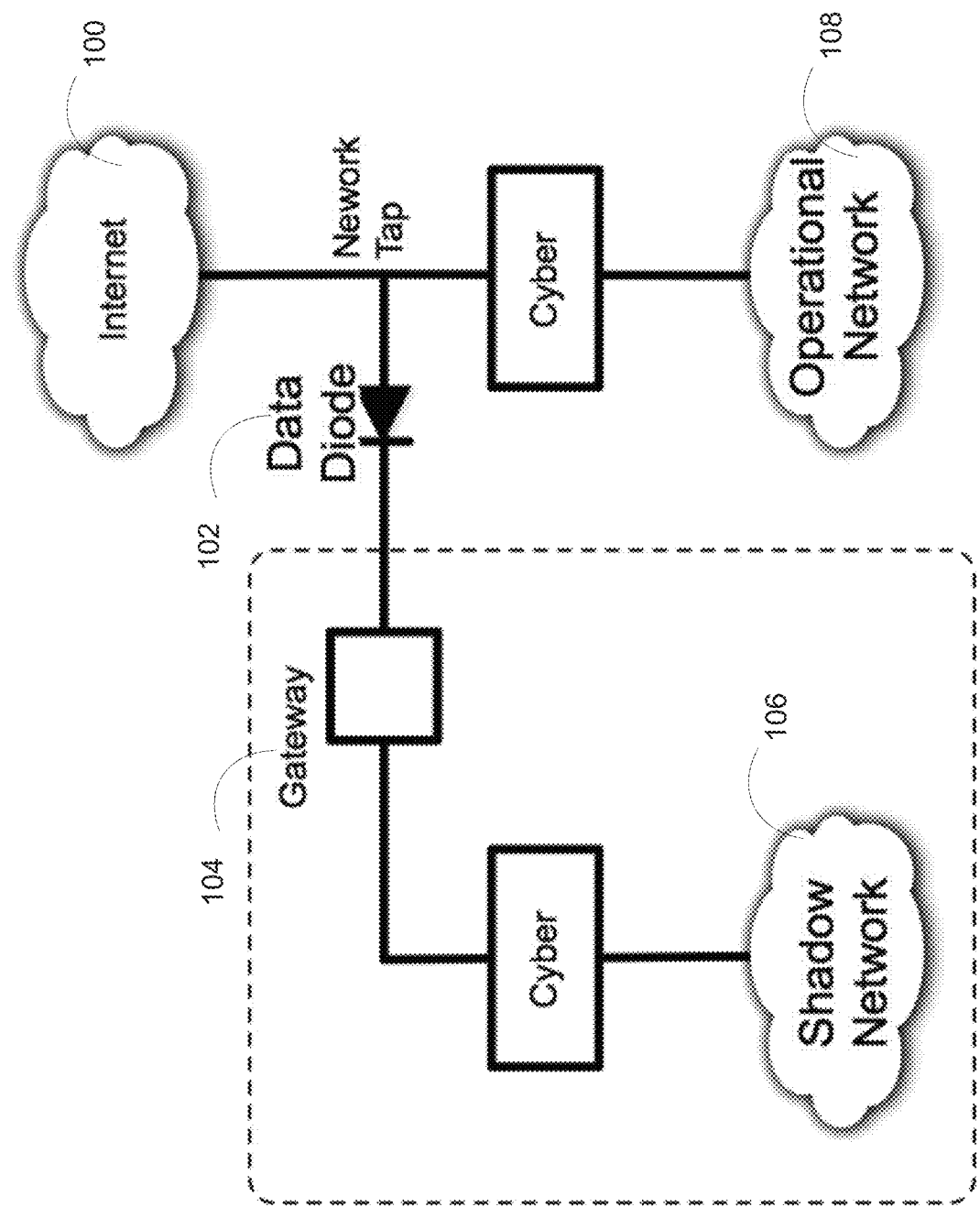
FIG. 1 is a block diagram of an operational network isolated from a shadow network.

A one-step removed shadow network (shadow network) duplicates some of the cyber security components of an operational network. A specialized shadow network gateway duplicates all of the network traffic to and from the operational network and shunts the duplicate traffic one-way to the shadow network. The specialized gateway integrates functions of a network bridge (by connecting a real and simulated network using the same communication protocol), a network gateway (that connects a real and simulated network by modifying network protocols), and a load balancer (that divides traffic between interfaces) in a unitary chip that emulates Transmission Control Protocol (TCP) connections, socket creations, and address resolutions.

The disclosed technology allows programmers to train on real network traffic processed on a remote network without affecting identical data as it is processed on the operational network. Because the cyber components are not emulated, but are instead duplicated on the shadow network, and real network traffic is used, users can train in real operating conditions. Further, potential security solutions and network reconfigurations can be evaluated and validated without touching the operational network. Because true cyber components are used with the real network traffic, the shadow network provides an effective "in situ" testbed without subjecting the operational network to potential harm.

The shadow networks correspond to real operational networks. The shadow network may include the shadow network gateway (henceforth a "gateway", a "one-step removed gateway" or an "1SR Gateway"), a replicated portion of an operational network, and an intelligent data logging module and replay module. The gateway may be installed at the edge of the operational network. Incoming traffic to the operational network is duplicated and transmitted to the shadow network and an intelligent storage through a specialized data diode (data diode). The shadow network receives all of the traffic to an operational network. Outgoing traffic from the operational network is also duplicated and transmitted to the gateway and intelligent storage. No traffic from the shadow network or from intelligent storage passes through the gateway to either the operational network or an external network.

Some shadow networks duplicate the defensive components of the operational network to replicate its cyber security defenses (edge router, gateways, firewalls, IDS/IPS appliances, etc.). Additional hosts may be created too using either real or virtual machines. In some instances, the shadow networks do not fully replicate the operational network. Essentially, if the operational network issues an alert on traffic, blocks traffic, or permits traffic flow, the shadow network executes the same functions. In an Internet context, this requires that TCP connections be established and that address resolution be maintained, even when outbound traffic is blocked.

Intelligent storage in the shadow network may maintain a buffer of the network traffic. Traffic that is parsed and then stored in the intelligent storage may be passed through a machine learning system that marks some of the data for storage and some for destruction. A "sifting" process reduces the amount of traffic stored, by discarding data such as personal identification information that is deemed not to alter the alerts issued by the cyber tools. In some applications, a "sifting" does not store data that the shadow network expects to receive from other available public sources. Machine learning may also be used to selectively store data based on its similarity to known significant traffic, which in some alternatives occurs through data comparisons to other data. The "sifting" may be executed on or a remote stand-alone system or on/within the shadow network.

In FIG. 1, traffic from the outside network is routed through a data diode 102 via a network tap. The data diode 102 enables unidirectional data transfer of data to the gateway 104 and provides separation between the shadow network 106 and the operational network 108, which may comprise an enterprise network. The data diode 102 and gateway 104 prevent traffic from escaping from the shadow network 106, by modifying traffic so that the shadow network 106 receives complete protocol connections. The isolation may be achieved through a data diode 102 comprising a simplex optical link that has a single light source and one photo detector. The isolation prevents any TCP handshaking protocol from traveling from a destination computer back to the source computer, thus assuring a reliable one-way transfer.

Figure 2:
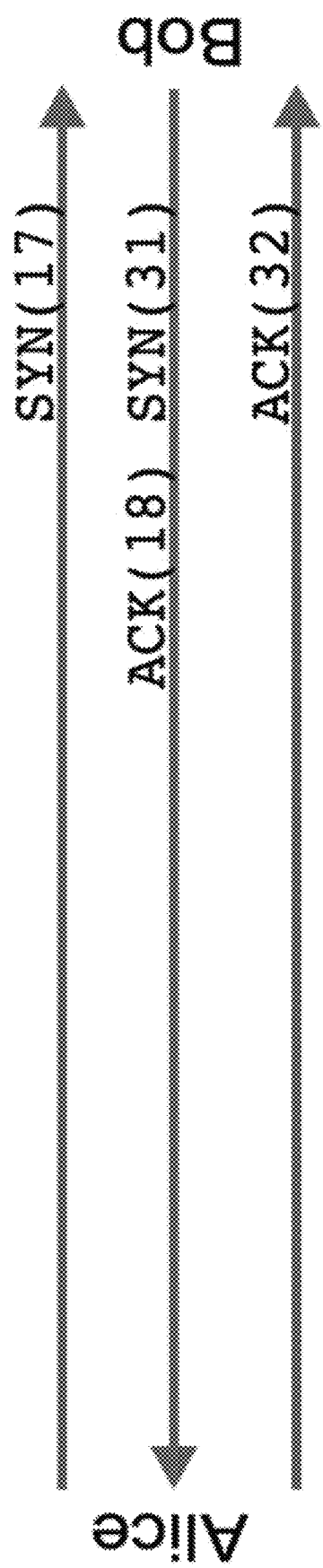
FIG. 2 is a flow diagram of a transmission control protocol.

TCP is a stateful protocol as shown in FIG. 2. The SYN, ACK, and FIN flags in a TCP header are used to open and close TCP connections. Packets containing these flags may be sent in response to network calls to open or close a socket. When an external network 100, such as Alice, creates a socket, the operating system coordinates the establishment of the TCP connection with Bob, the operational network 108. The establishment involves a three-way handshake.

Alice (the external network 100) initiates the connection by sending a packet with the SYN packet set to 17, which is randomly generated. The SYN packet includes the initial sequence number for the sequence number field. That is, Alice's first SYN packet sequences the sequence numbers. After transmitting the SYN packet, Alice waits for a response from Bob (the operational network 108) who is listening for a request to establish a TCP connection. The arrival of a SYN packet flag set to 17, creates a socket and a transmission of an acknowledgement packet from Bob to Alice. The SYN packet flag set to 31, which is randomly generated, initiates the reverse direction of the connection from Bob to Alice and the ACK packet flag acknowledges receipt of Alice's SYN packet. The acknowledgement number in Bob's TCP header is set to a value one greater than the initial sequence number in Alice's SYN packet. As with Alice, Bob's SYN packet includes an initial sequence number that marks the beginning of the stream of bytes traveling from Bob to Alice that is unrelated to Alice's initial SYN number. When the SYN and ACK packet arrives, Alice acknowledges that the connection is complete by sending an ACK packet to Bob and begins writing to and reading from the open socket. Alice's ACK packet has an acknowledgement number set to a value one greater than the initial sequence number in Bob's SYN packet, which upon receipt, allows Bob to transmit data through the open socket to Alice.

Figure 3:
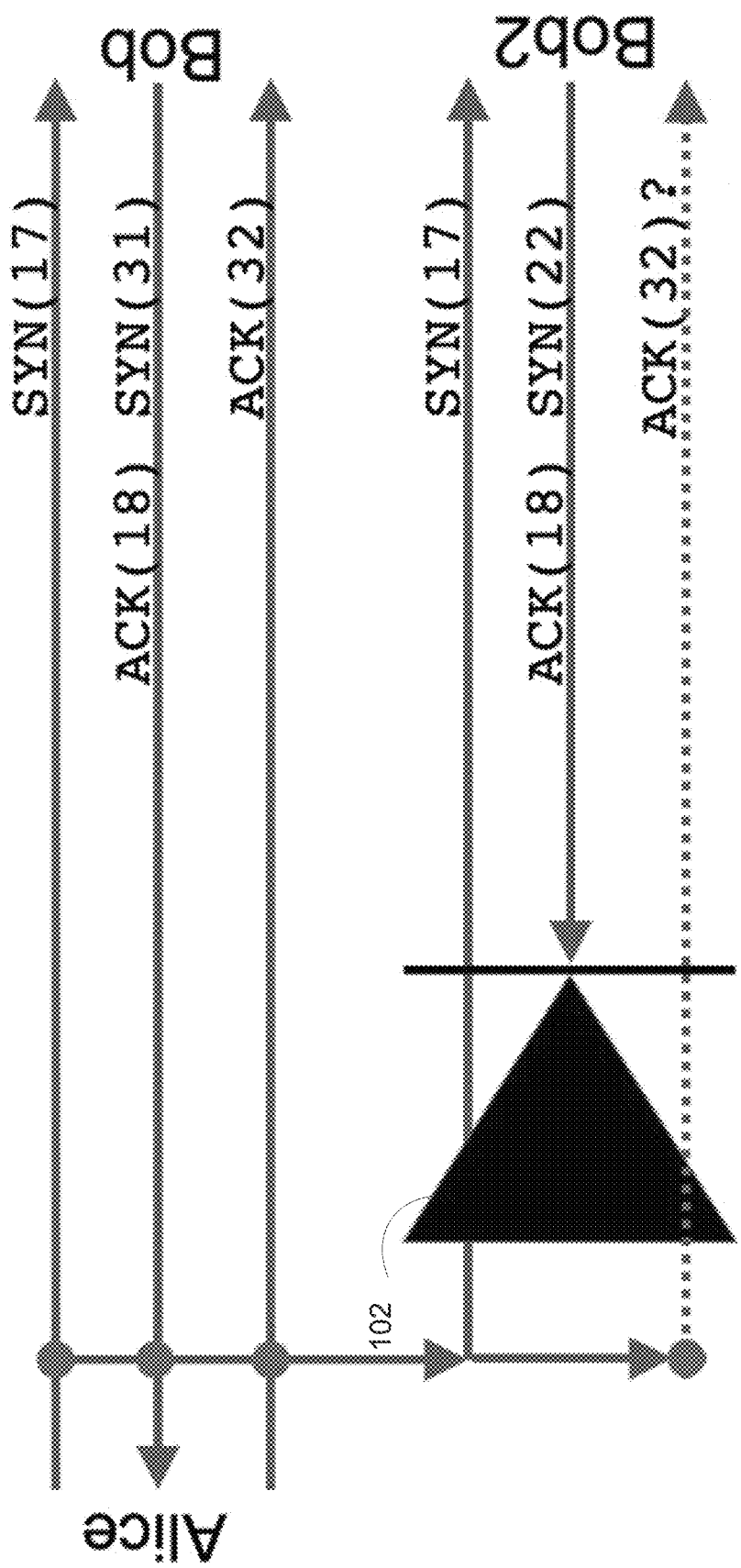
FIG. 3 is a flow diagram of the operational network coupled to the shadow network through a data diode.

Because operating systems select different initial sequence numbers for TCP connections, the addition of the data diode 102 across the connection tap does not enable bi-directional communication between Bob2 (the shadow network 106) and Alice (the external network 100) as shown in FIG. 3. When Alice (the external network 100) initiates the connection by sending a packet with the SYN packet set to 17, it is duplicated and transmitted to Bob2. The SYN packet includes the initial sequence number 17 for the sequence number field. The arrival of a SYN packet flag set to 17, creates a socket and a transmission of an acknowledgement packet from Bob to Alice and from Bob2 to the cathode of the data diode 102. The SYN packet flag set to 31, initiates the reverse direction of the connection from Bob to Alice and the ACK packet flag acknowledges receipt of Alice's SYN packet. The SYN packet flag set to 32, initiates the reverse direction of the connection from Bob2 to the data diode 102 and the ACK packet flag acknowledges receipt of Alice's SYN packet. The acknowledgement number in Bob and Bob2's TCP headers are set to the value one larger than the initial sequence number in Alice's SYN packet. When Bob's SYN and ACK packet arrives, Alice acknowledges that the connection is complete by sending an ACK packet to Bob, which is duplicated and sent to Bob2, which allows Alice to begin writing to and reading from the socket. Alice's ACK packet has an acknowledgement number set to a value one larger than the initial sequence number in Bob's SYN packet, which is not incrementally higher (i.e., not value+1 higher than) Bob2's initial sequence number. As a result, upon receipt Bob can write and read from the socket to Alice while Bob2 remains waiting listening for an ACK value that would complete a connection. It never occurs.

Figure 4:
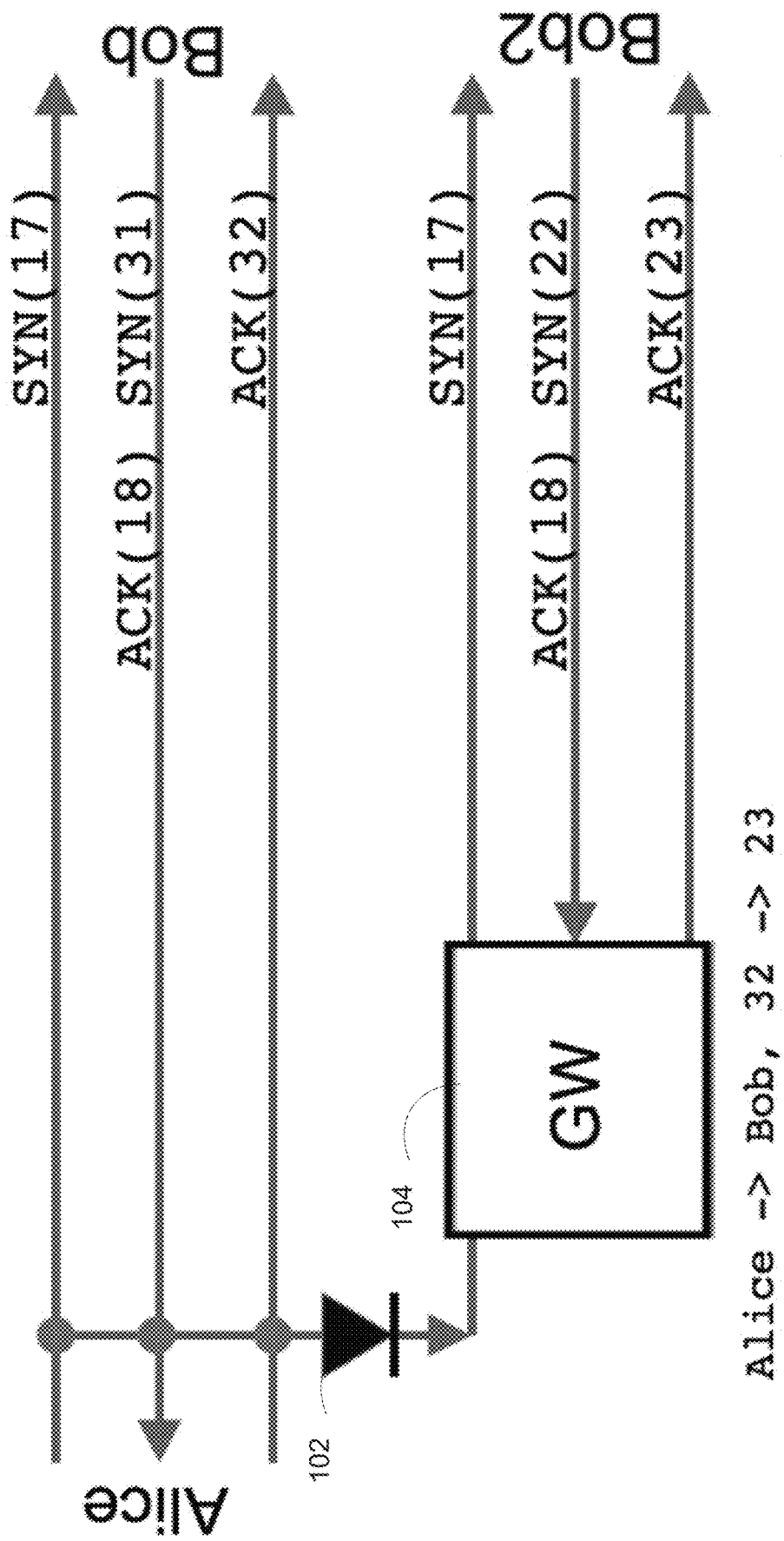
FIG. 4 is a flow diagram of the operational network coupled to the shadow network through the data diode and a specialized gateway.

In FIG. 4, the gateway 104 is used to convert Alice's ACK packet flag to a value one larger than (e.g., value+1) Bob's initial SYN packet value. By keeping track of Bob2's SYN numbers (via a processors core's monitoring and storing in memory), the gateway 104 maps Alice's ACK to a value that is incrementally greater than (e.g., value+1) Bob's initial sequence number 22. Knowing that Alice's ACK should be mapped to 23, the gateway 104 converts the acknowledgment number to 23, which allows Bob2 to transmit data to the cathode of the data diode 102 opening a connection with the gateway 104, which allows the cyber security defenses to be monitored without affecting the operation of the operational network 108.

The gateway 104 may also compensate for a sliding-window flow control. In TCP flow, the sender may limit the transmission of data to avoid overflowing the buffer space available at a receiver. This prevents the sender from transmitting more data than the receiver should store and prevents the sender from transmitting data more quickly than the network can handle, which can increase latency and the likelihood of losing packets. To address these conditions, a TCP sender can limit the number of unacknowledged bytes in the network using a sliding-window flow control that is represented as a receive window in the TCP header. The receive window indicates the number of bytes Alice can send beyond the last byte acknowledged by Bob. Suppose the operating system running Bob's application has increased its allocation receive buffer from 100 bytes to 200 bytes. Further, suppose that Bob received and acknowledged 100 bytes from Alice and 100 bytes have been read by Bob and Bob2 allocated a 100 byte receive buffer. Thus, Bob's receive buffer is empty, and Bob can handle 200 additional bytes of data. If Bob2 does not know that the flow control window size has changed, and the 200 bytes arrives with a sequence number, the gateway 104 divides the 200 bytes into two or more packets having a size that Bob2 can handle (e.g., two 100 byte transmissions). The packets are then transmitted to Bob2 separately with their own continuous increasing sequential sequence number without the risk of overflowing Bob2's buffer. Bob may also invoke a system call to decrease the transmission size to indicate a decreased size in a TCP receive buffer. Under these conditions, the gateway 104 may transmit the bytes as they are received with the appropriate SYN packet flag or in alternate systems, aggregate and transmit the bytes to Bob2 when a threshold storage level is reached. The bytes are then transmitted with the appropriate SYN packet flag.

Figure 5:
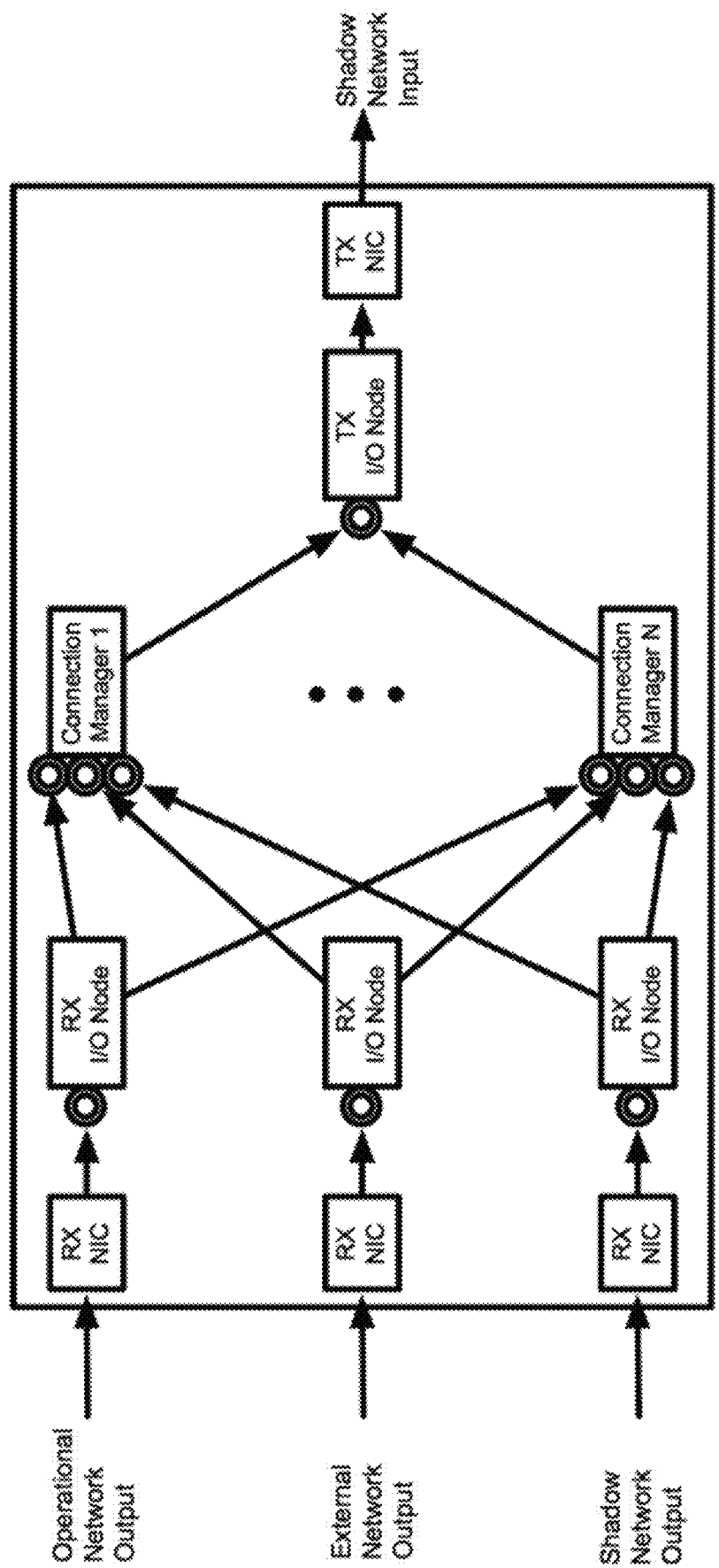
FIG. 5 is a block diagram of the specialized gateway.

The gateway 104 shown in FIG. 5 has four network interfaces that receive traffic from Bob (the operational network 108), Alice (the external network 100), Bob2 (the shadow network 106) and send traffic to Bob2. Bob and Alice represent the real Web service and the remote users sending traffic via the Internet to the gateway 104 and Bob2 represents the output coming from the shadow network 106. The gateway monitors Bob2 to identify the sequence numbers being generated by Bob2. Traffic is received by receive network interface connections and receive nodes, that are load balanced across the connection managers. The connection managers collect the various flows across the receive network interfaces and convert or re-write them as described above before they are transferred to a transmit node. The transmit network interface transmits the received flows to the shadow network 106 in a sequence and form compatible with the shadow network protocol. The only data making up the two-way traffic is the data received from Bob2 flowing into the gateway 104 and the data transmitted to Bob2 flowing out of the gateway 104.

Figure 6:
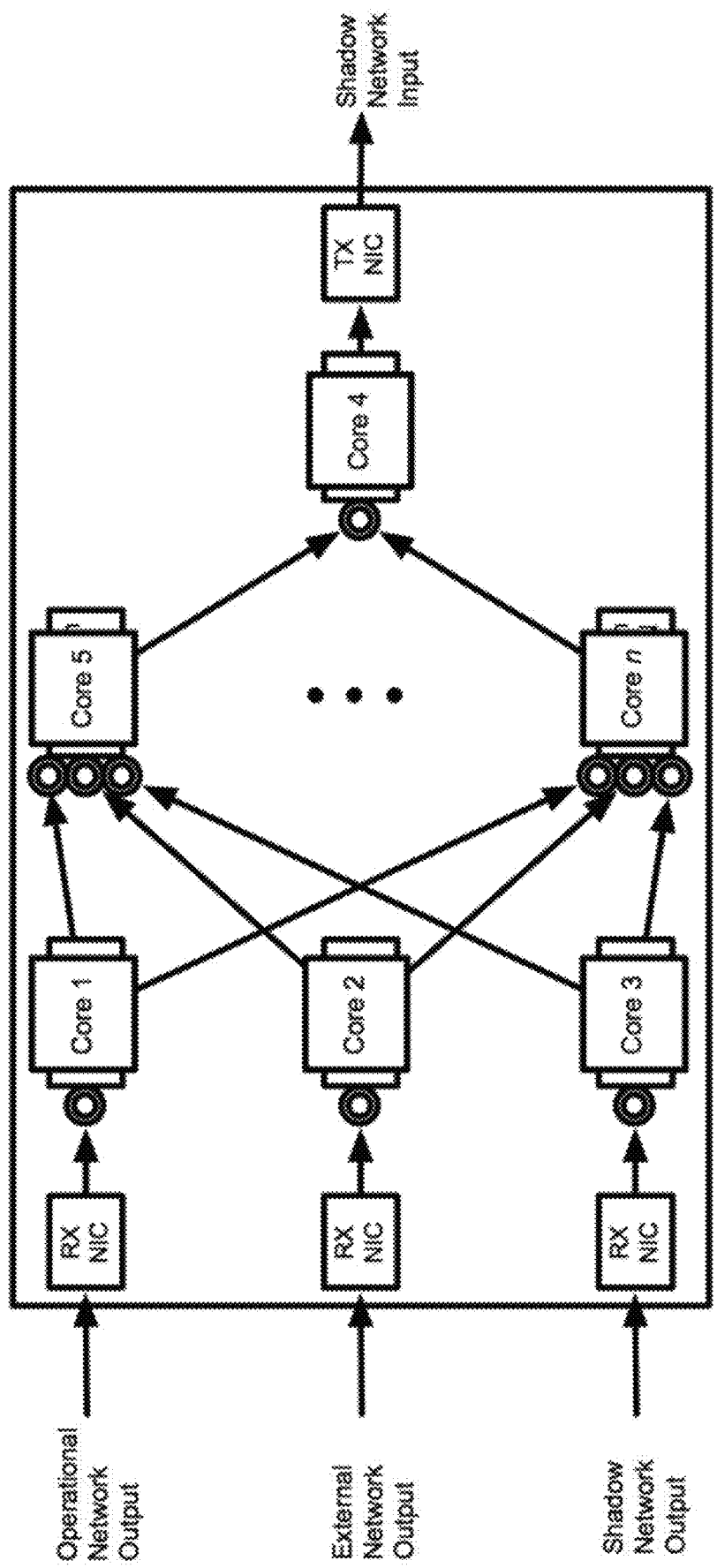
FIG. 6 is a second block diagram of the specialized gateway.

FIG. 6 shows how the gateway functionality maps on to separate cores of a microprocessor. As the number of processor cores increase, the gateway's bandwidth increases, which results in increased network processing speeds. Each process described above is mapped onto a dedicated processing core, allowing the processes to run independently, in parallel, and in real-time. Real-time relates to processing data at the same rate the data is received. This allows the system to grow and increase with each additional processing core providing scalability, and in some instances, faster than real-time processing. In FIG. 5, processing cores 1 through 3 handle load balancing, processing cores 5 though N handle the conversions described above and processing core 4 directs traffic to the shadow network 106 through a modified handshake connection.

Figure 7:
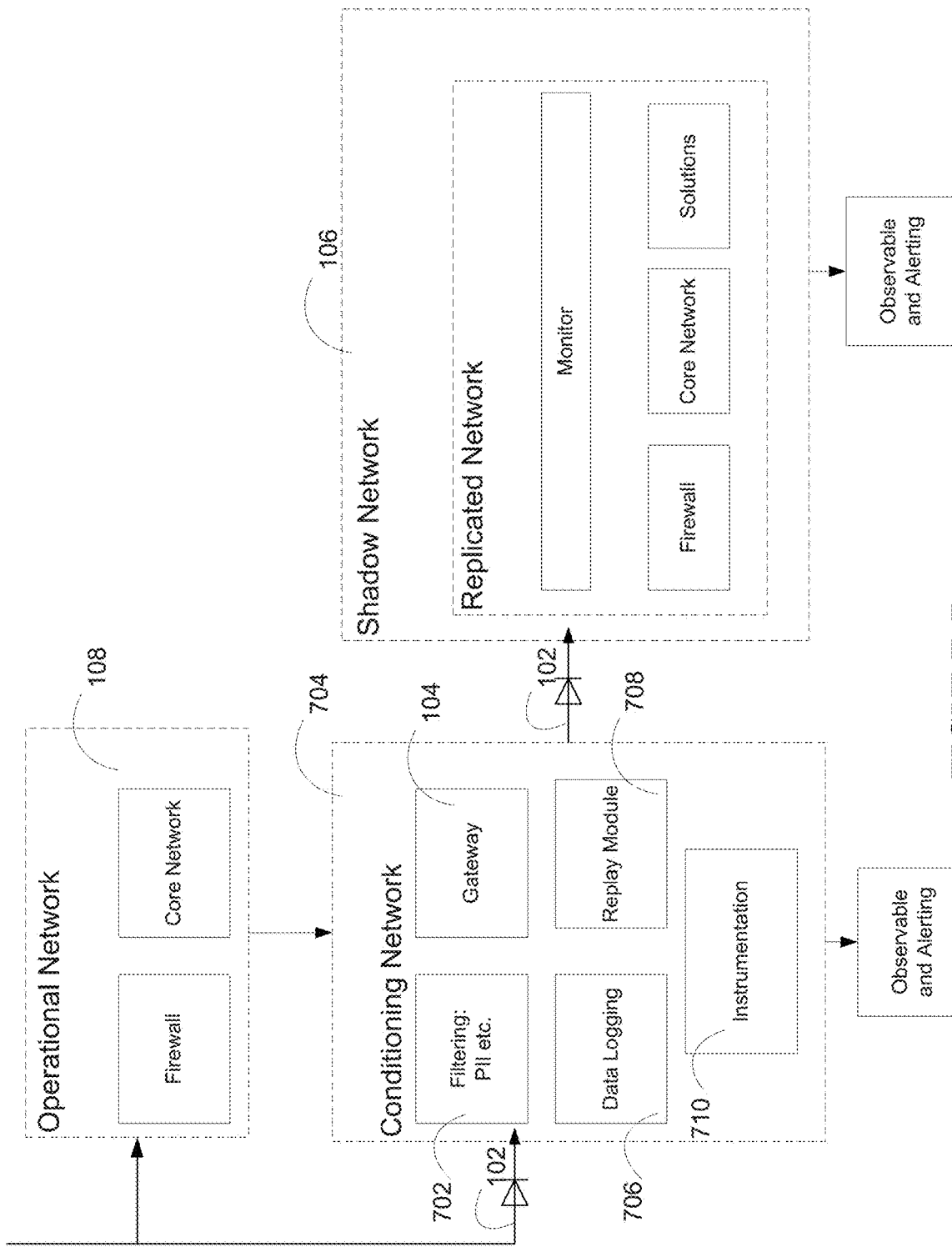
FIG. 7 is a block diagram of the operational network coupled to the shadow network through the data diode and the specialized gateway.

FIG. 7 is a block diagram that shows the shadow network 106 remote from the operational network 108. The operational network 108 is near the top of the FIG. 7, and the shadow network 106 is near the bottom right side. External incoming network traffic for the operational network 108 is duplicated and transmitted through one of the data diodes 102, gateway 104, and filters 702 to the shadow network 106. The shadow network 106 thus receives the same traffic as the operational network 108.

Because data arriving at the operational network 108 may contain sensitive data that is intended solely for the operational network 108, some data filtering may occur after passing through the first data diode 102. The data diode 102 allows the incoming traffic through, but no network traffic to pass outward from the conditioning network 704 and the shadow network 106. The filtering 702 identifies personally identifiable information (PII) in unencrypted data by detecting markers or tags or be executing comparisons to known PII data stored in memory and replaces the detected PII with placeholders in the unencrypted data. The PII identification may also occur through machine identifications that identify PII data by tracking sources via IP addresses and known hostnames and/or apply rules based on identifying data in compliance with the Health Insurance Portability and Accountability Act Security Rule. In some systems, data from sensitive sources are intercepted, parsed, and stripped before being passed through the gateway 104, the second data diode 102 to the shadow network 106. Filters 702 are applied to the network traffic before this stage so no sensitive data is leaked from the conditioning network 704 and the shadow network 106.

Once filtered, the replicated data originating from the operational network 108 and external network 100 (not shown) passes through the gateway 104 and is stored in volatile or non-volatile memory with the data received from the shadow network 106 by an intelligent logging module 706. As shown in FIG. 7, a replay module 708 may provide delayed or immediate playback of all or parts of the socket with the shadow network 106 and/or data exchange between the gateway 104 and the shadow network 106 to evaluate technologies and/or monitor data flow. Because the gateway 106 automatically corrects sequence numbers and compensates for sliding-window flow control, the playback module 708 can execute replays fluidly at any speed and may monitor and track any packet flows.

Instrumentation modules 710 or cyber tools may also be part of the conditioning network 704 looking for attempted exfiltration from the conditioning network 704 and shadow network 106, suspicious activities, software intended to damage or disable computers, malware, and/or other on-line threats. The instrumentation module 710 or cyber tools generates observations and alerts that maybe transmitted directly to end users, visualization systems and/or other systems through an Application Programming Interface (API).

Figure 8:
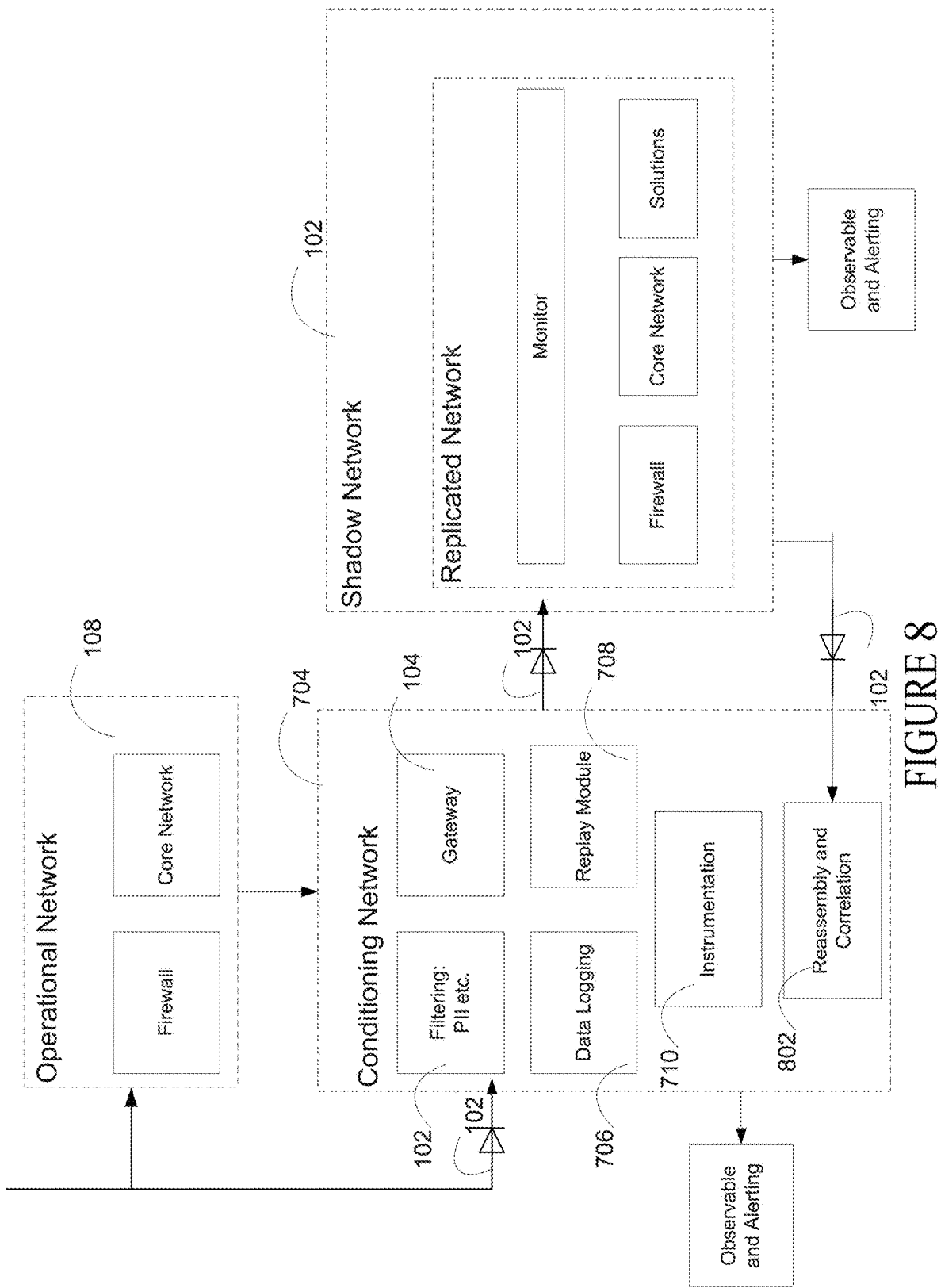
FIG. 8 is a second block diagram of the operational network coupled to the shadow network through the data diode and the specialized gateway.

As shown in FIG. 7, data from the conditioning network 704 is fed through the second data diode 102 to the shadow network 106. The shadow network 106 replicates some or the entire operational network 108, the technologies to be observed (shown as the "solutions") and a network monitoring module. The shadow network 106 is an open environment, allowing new, modified, and/or different technologies to be evaluated without having to certify the technologies for the network, and for users to be trained without granting access privileges to the operational network 108. The observations and alerts may be transmitted directly to the end users, to visualization systems, and/or other systems through a second API. In FIG. 8, the output of the shadow network 106 is fed through a third data diode 102 to a reassembly and correlation module 802 that measure the linear covariation of the data received at the input and output of the shadow network 106 with the incoming network traffic of the operational network 108 and external network 100. The degree and direction of the linear association of the data enables monitoring of persistent network connections (remote shells, for instance) and a "tagging" of network traffic for further analysis.

Figure 9:
FIG. 9 is a visualization rendered by a conditioning network and/or the shadow network.

In some systems, a visualization service may provide visualization of the data by port, by protocol, by country, by incoming connections and/or through network flows as shown in the display of FIG. 9. The interface allows users to select the intervals to view, which renders the network flows that match whatever criteria the user selects. It also shows the size of each flow. The interface allows users to isolate traffic from a particular country (e.g., China) causing all other displays shown to adapt to that selection. The interface allows the user to select a specific type of traffic (e.g., Internet Control Message Protocol or ICMP, for example), with the top of the display rendering a histogram showing the total traffic over time.

Figure 10:
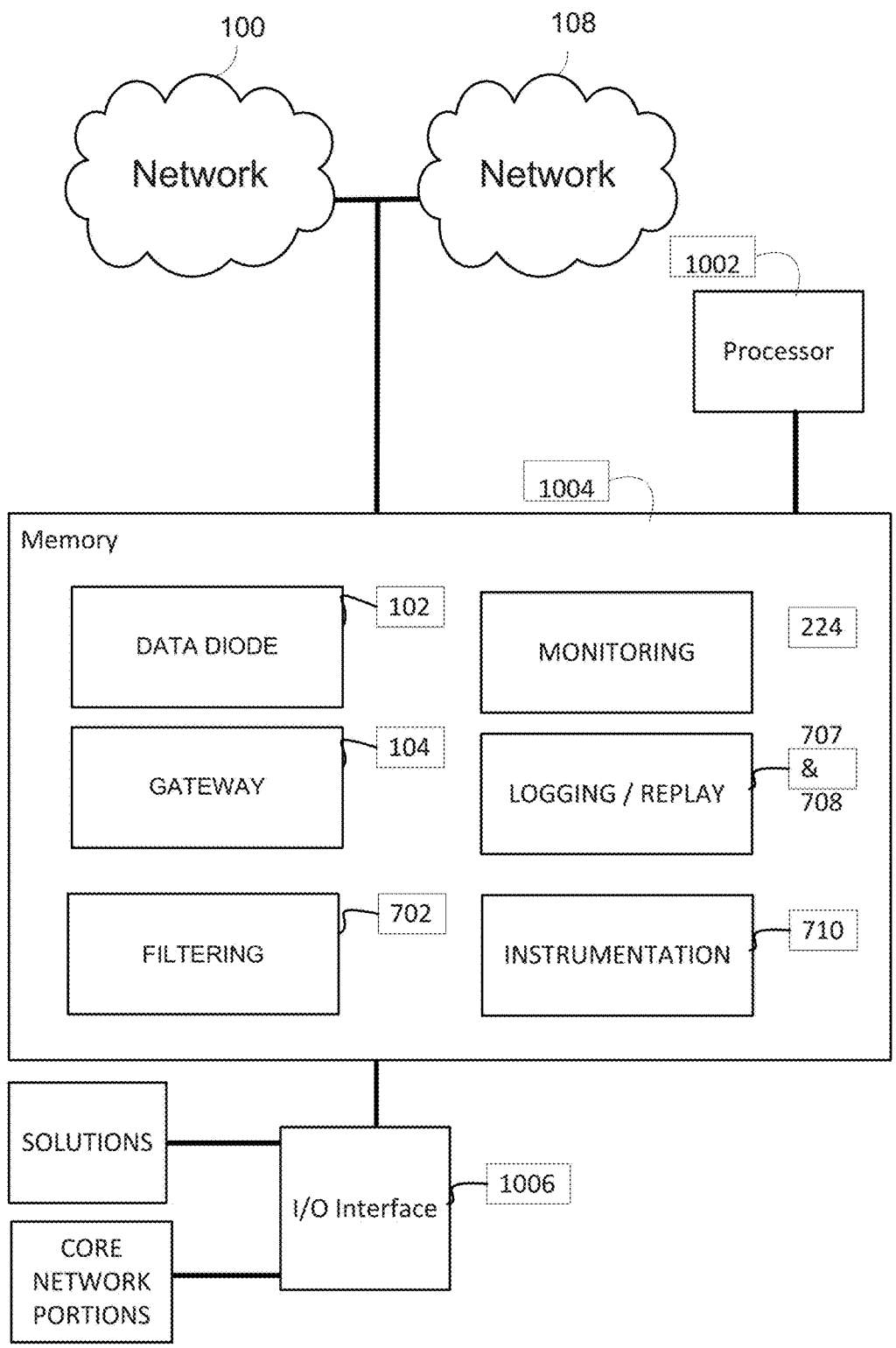
FIG. 10 is a block diagram of the conditioning and the shadow network.

FIG. 10 is a block diagram of a conditioning and shadow network. The system comprises a processor 1002, a non-transitory media such as a memory 1004 (the contents of which are accessible by the processor 1002) and an I/O interface 1006. The memory 1004 may store instructions which when executed by the processor 1002 causes the system to render some or all of the functionality associated with the conditioning network 704 and some of the functionality of the shadow network 106. For example, the memory 1004 may store instructions which when executed by the processor 1002 causes the system to render the functionality associated with one or more data diodes 102, gateways 104, the filters 707, intelligent logging modules 706, replay modules 708, instrumentation modules 710, monitoring modules, APIs, and new/modified/different technologies (shown as external to the memory 1004, but some may be stored in memory 1004) and/or some (e.g., any combination) or all combinations of the components described. In addition, data structures, temporary variables and other information may store data in data storage 1004.

Within the shadow network 106, a minimum amount of configuration enables replication of the operational network's cyber defense posture. The firewalls, network segmentation, and scanning software maybe replicated using software defined networks (SDNs) and a small number of both real and virtual endpoints. In some systems, the entire operational network 108 is not replicated; in those instances, only the components that contribute to the network defense layer are replicated. Because of this reduction, an entire operational network 108 can be virtually replicated in a "one step removed" fashion, reducing enterprise hardware to a single simulation.

The processor 1002 may comprise a single processor with multiple cores or multiple processors with one or multiple cores that may be disposed on a single chip, on multiple devices or distributed over more than one system. The processor 1002 may be hardware that executes computer executable instructions or computer code embodied in the memory 1004 or in other memory to perform one or more features of the disclosed system. The processor 1002 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 1004 or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 1004 may comprise a single device or multiple devices that may be disposed on one or more dedicated memory devices or on a processor or other similar device.

The memory 1004 may also store computer code that may include instructions executable with the processor 1002. The computer code may be written in any computer language, such as C, C++, assembly language, channel program code, and/or any combination of computer languages. The memory 1004 may store information in data structures including, for example, feedback and or echo canceller coefficients that render or estimate echo signal levels. The I/O interface 508 may be used to connect devices such as, for example, new technologies to the system.

FIG. 11 is a process of interfacing the operational network 108 and external network 100 to the shadow network 106. The process opens a first transmission protocol socket between the operational network 108 and the external network 100 at 1102. The process enables the one-way transfer of all information received from the external network 100 and transmitted by the operational network 108 to the gateway 104 such that no information travels from the gateway 104 to the operational network 108 and/or the external network 100 at 1104. The process simulates a handshake opening a second transmission protocol socket with what appears to be but actually is not the external network 100 by mapping a sequence packet number to an acknowledgment number with the acknowledgement number being one larger than (acknowledgement number=sequence packet number+1) the value of sequence number packet at 1106. The transmission of the acknowledgment packet to the shadow network 106 completes the three-way handshake and opens the socket between the gateway 104 acting as a surrogate for the external network 100 and the shadow network 106.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The term "coupled," disclosed in this description may encompass both direct and indirect coupling. Thus, first and second networks are said to be coupled when they directly communicate with one another, as well as when the first network communicates either with an intermediate component, which couples directly or via one or more additional intermediate components, communicate to the second network. The term "substantially" or "about" may encompass a range that is largely, but not necessarily wholly, that which is specified. It encompasses all but a significant amount, such as a variance within five or ten percent. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

The disclosed architecture separates two aspects of system maintenance and development: the technical and algorithmic skill required maintaining an operating network; and the design skill required to modify the network through a self-contained replication. The disclosed architecture allows the level of resiliency required for a particular system to be operated or actuated in response to the system's own control and to be modified or actuated dynamically using the replicated system's operation in an operating environment or state of the operational network 108 that neither external users nor internal users may know exist. The shadow network's unique configuration and process flows allows remote systems and/or administrators to monitor network operation and/or data flow without the end user's knowledge.

The disclosed shadow network 106 duplicates some of the cyber security components of an operational network. The gateway 104 duplicates all of the network traffic to and from the operational network 108 and shunts the duplicate traffic one-way to the shadow network 106. The gateway 104 integrates functions of a network bridge (by connecting a real and simulated network using the same communication protocol), a network gateway (that connects a real and simulated network by modifying network protocols), and a load balancer (that divides traffic between interfaces) in a unitary chip. The chip emulates TCP connections, socket creations, sliding window flow control, and address resolutions.

While various embodiments of the invention have been described, it will be apparent to those of ordinary skill in the art that many more embodiments and implementations are possible within the scope of the inventions. Accordingly, the inventions are not to be restricted except in light of the attached claims and their equivalents.

What is claimed is:

1. A system comprising:
an operational network that communicates with an external network by opening a first transmission protocol socket;
a data diode coupled to the operational network and a gateway that enables one-way transfer of all information received from the external network and transmitted by the operational network to the gateway such that no information travels from the gateway to the operational network and to the external network;
the gateway simulates a handshake enabling the opening of a second transmission protocol socket by mapping a sequence number packet to an acknowledgment packet number such that the acknowledgement packet number is one larger than a value of the sequence number packet; and
a transmitter that transmits the acknowledgment to a remote network.

2. The system of claim 1 wherein the data diode is directly connected to the gateway.

3. The system of claim 1 wherein a cathode of the data diode is directly connected to the gateway.

4. The system of claim 1 wherein the operational network comprises a firewall.

5. The system of claim 4 wherein the operational network comprises a core network.

6. The system of claim 1 wherein the operational network comprises a core network.

7. The system of claim 1 wherein the gateway responds to a change in a sliding-window flow control by a division of the data received into a plurality of packets that are separately transmitted appended to a sequentially increasing sequence number.

8. The system of claim 1 wherein the remote network comprises a replication of the operational network.

9. The system of claim 1 wherein the remote network comprises a replication of a portion of the operational network.

10. The system of claim 1 wherein the gateway comprises a device that connects the remote network to a physical external network and a simulated external network communication through a load balancer.

11. The system of claim 1 wherein the remote network comprises a replication of a portion of a simulation of the operational network.

12. The system of claim 1 wherein the gateway comprises a device that connects the remote network to a real and a simulated external network communication via a modification of a transmission protocol sequence number.

13. A non-transitory machine-readable medium encoded with machine-executable instructions, wherein execution of the machine-executable instructions is for:
opening a first transmission protocol socket between an operational network and an external network;
enabling a one-way transfer of all information received from the external network and transmitted by the operational network to a gateway such that no information travels from the gateway to the operational network or to the external network;
simulating a handshake that enables the opening of a second transmission protocol socket by mapping a sequence number to an acknowledgment number with the acknowledgement number modified such that the acknowledgement number is one larger than the sequence number; and
transmitting the acknowledgment to the gateway.

14. The non-transitory machine-readable medium of claim 13 wherein the operational network comprises a firewall.

15. The non-transitory machine-readable medium of claim 14 wherein the operational network comprises a core network.

16. The non-transitory machine-readable medium of claim 13 wherein the operational network comprises a core network.

17. The non-transitory machine-readable medium of claim 13 further comprising responding to a change in a sliding-window flow control by a division of data received into a plurality of packets that are sequentially transmitted with an appended sequentially increasing sequence number.

18. The non-transitory machine-readable medium of claim 13 wherein the acknowledgement passes through a remote network that comprises a replication of the operational network.

19. The non-transitory machine-readable medium of claim 13 wherein the acknowledgement passes through a remote network that comprises a replication of a portion of the operational network.

20. The non-transitory machine-readable medium of claim 13 wherein the gateway comprises a device that connects a remote network to a physical external network and a simulated external network communication via a modification of a transmission protocol.

21. The non-transitory machine-readable medium of claim 13 wherein the acknowledgement passes through a remote network that comprises a replication of a portion of a simulation of the operational network.

22. The non-transitory machine-readable medium of claim 13, further comprising executing instructions connecting a remote network to a real and a simulated external network communication via a load balancer.

23. A method comprising:
opening a first transmission protocol socket between an operational network and an external network;
enabling a one-way transfer of all information received from the external network and transmitted by the operational network to a gateway such that no information travels from the gateway to the operational network or the external network;
simulating a TCP handshake that enables the opening of a second transmission protocol socket by mapping a sequence number to an acknowledgement number such that the acknowledgment number is modified such that the acknowledgement number is incrementally larger than a value of the sequence number; and
transmitting the acknowledgment to the gateway.

* * * * *